Sept. 28, 1954
H. SINCLAIR
2,690,127
SPEED AND FREQUENCY GOVERNOR
Filed Feb. 15, 1951
2 Sheets-Sheet 1
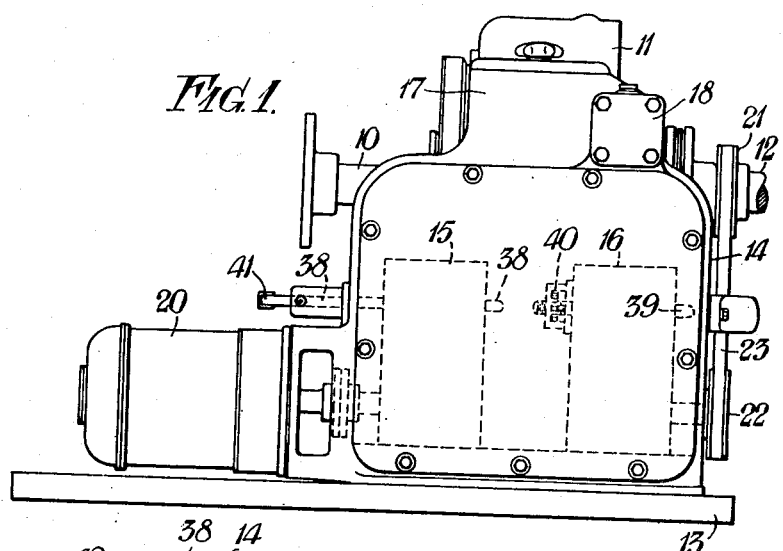
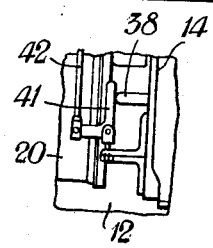
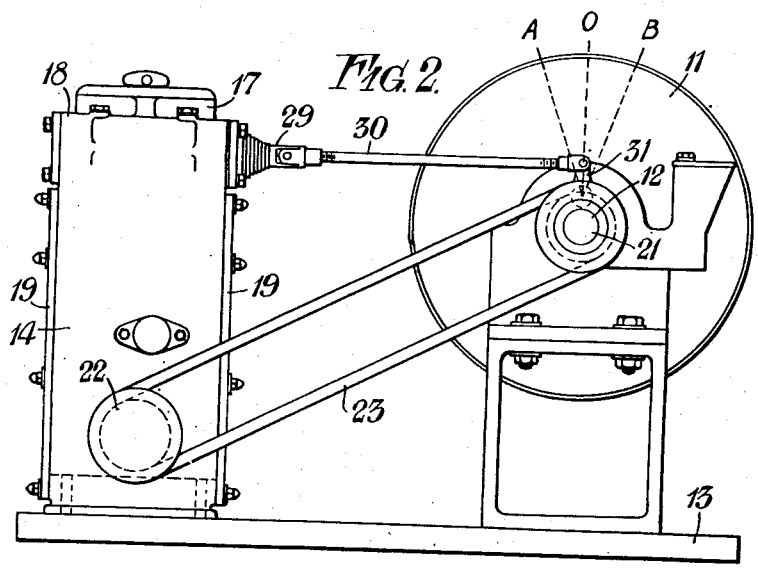
INVENTOR
Harold Sinclair
BY
ATTORNEYS Sept. 28, 1954     H. SINCLAIR     2,690,127
SPEED AND FREQUENCY GOVERNOR
Filed Feb. 15, 1951     2 Sheets—Sheet 2
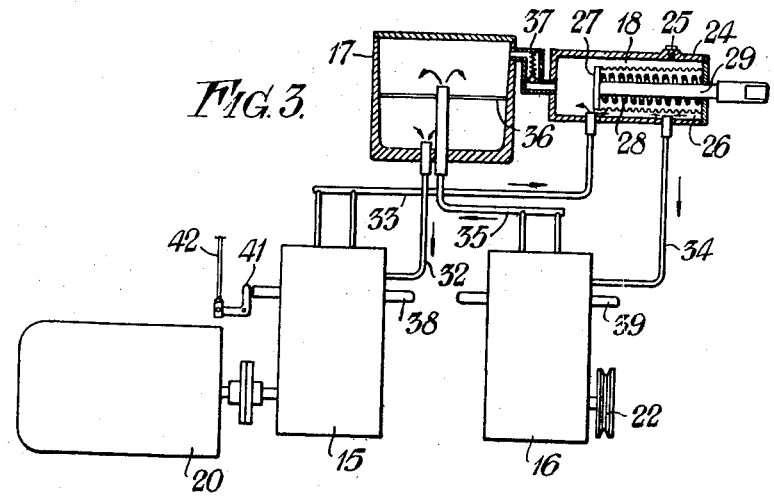
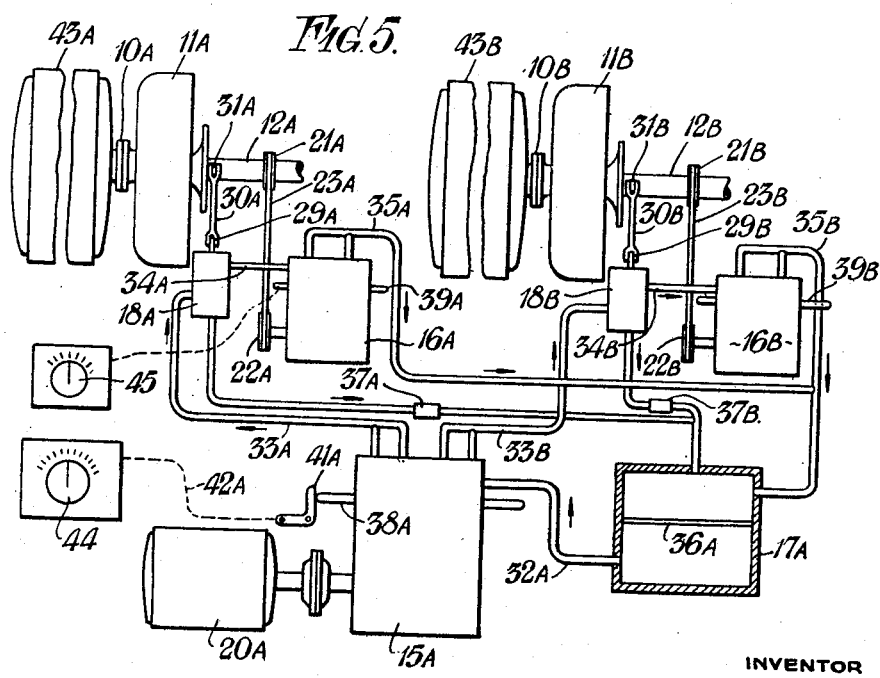
INVENTOR
Harold Sinclair
BY
Dean Fairbank & Hirsch
ATTORNEYS Patented Sept. 28, 1954

2,690,127

UNITED STATES PATENT OFFICE 2,690,127

SPEED AND FREQUENCY GOVERNOR

Harold Sinclair, London, England

Application February 15, 1951, Serial No. 211,007

Claims priority, application Great Britain
February 20, 1950

10 Claims. (Cl. 103—11)

This invention relates to speed governors, i. e. devices adapted to be driven by a rotary member or an oscillatory member and to actuate an element which adjusts the speed of rotation of the member in such a manner as to maintain the speed substantially at a predetermined value, or in a predetermined relationship to the speed of another member.

An object of this invention is to provide a governor which is capable of adjustment so as to enable the predetermined speed value to be fixed at any desired point over a wide speed range.

Another object is to enable the sensitivity of the governor to be varied, so that it is adaptable to various speed ranges and various rates of response of the speed value to actuation of the adjusting element.

Another object is to permit the speeds of two or more rotary members to be controlled in unison.

According to this invention, a governor includes a first pump of the positive-displacement type having a control member operable for varying its specific delivery rate, i. e., its delivery rate when it is driven at a constant speed, a second pump of the positive-displacement type also having a control member operable for varying its specific delivery rate, a control-pressure duct connecting the delivery passage of one of the pumps to the inlet passage of the other pump, and an actuator communicating with the said duct. The fluid pumped by the pumps is preferably a liquid, e. g. oil, flowing in a closed circuit from one pump to the other and back again; in this case a liquid reservoir is included in a return duct between the pumps.

Embodiments of the invention, employing pumps such as are used as fuel-injection pumps as used on road vehicles, but with harmonic cams or other cams giving relatively low accelerations and correspondingly less violent impulses to the fluid, will now be described, by way of example, with reference to the accompanying drawings wherein:

Figure 1 is a view in elevation of an installation employed to connect a constant speed main motor to a member required to be driven at any one of a wide variety of possible governed constant speeds.

Figure 2 is an end view of the installation in Figure 1.

Figure 3 shows diagrammatically the fluid circuit of the governor of the installation in Figures 1 and 2.

Figure 4 is a plan view of a detail in Figure 1.

Figure 5 shows diagrammatically the fluid circuit of the governor of an installation including two driven members, each driven by a constant speed motor, the speeds of which members are required to be maintained constant and in a predetermined ratio to each other.

Referring now to Figures 1 to 4, the constant speed main motor (not shown) of the installation is coupled to an input shaft 10 of a hydraulic turbo-coupling 11 of the scoop-control type (as described for example in United States patent specification No. 2,187,667 filed January 16, 1940, with reference to Figure 1 thereof). The coupling is supported between the main motor and the driven shaft 12 of the member to be driven (also not shown).

The governor is mounted on a base plate 13 and comprises a casing 14 fixed to the base plate 13 and enclosing a twin-cylinder setting pump 15, a twin-cylinder metering pump 16, a reservoir 17 and an actuator 18. The casing 14 is provided with removable inspection covers 19. A constant speed governor motor 20 is fixed rigidly to the casing 14 and drives the setting pump 15. The metering pump 16 is driven from the output shaft 12 of the coupling 11 through pulleys 21 and 22 and a connecting V-belt 23.

The actuator 18 comprises a casing 24 (Figure 3) provided with an air bleed 25. A metal bellows 26 has its periphery at one end sealed to the casing 24 and its periphery at the other end sealed to a plate 27, thus forming a chamber which is sealed off from the remainder of the space enclosed by casing 24 in a fluid-tight manner and which encloses a compression spring 28 and a rod 29. The said remainder of the space enclosed by casing 24 will be referred to hereinafter as the "operating chamber." The rod 29 is fixed at one end to the plate 27 and is biased to the left, as seen in Figures 2 and 3, by the spring 28. The bias of the spring is opposed by the fluid pressure in the casing 24.

The free end of the rod 29 extends through an end plate of the casing 24 and is connected through a rigid link 30 to the scoop control lever 31 of the coupling 11. The lever 31 is shown in its central position O in Figure 2 and is movable between two extreme positions A and B through a total angle of about 40°. Movement of the lever 31 towards the position B causes a decrease in the slip in the coupling 11 and a corresponding increase in the speed of the output shaft 12, and movement towards the position A causes an increase in the slip and a corresponding decrease in the speed of the output shaft 12.

The direction of flow of the working fluid, which in this example is oil, is shown by arrows in Figure 3. The oil passes from reservoir 17 through an inlet duct 32 to the setting pump 15 and thence through an outlet duct 33 to the operating chamber of actuator 18. It passes from the operating chamber, through an inlet duct 34 to the metering pump 16 and returns to the reservoir 17 through an outlet duct 35. A filter element 36 is disposed within the reservoir 17 and the inlet and outlet ports of the reservoir are so located that oil passing through the reservoir must pass through the filter element. A relief valve 37 is provided between the operating chamber of the actuator and the reservoir to prevent any undue rise of pressure in the operating chamber, for example, when the rod 29 and the lever 31 reach the limit of their range of travel towards B.

It is preferred to use twin-cylinder pumps for the setting and metering pumps, the two cylinders of each pump feeding a common outlet duct, since such pumps have the advantage that by arranging the cycles of operation of the two cylinders 180° out of phase with one another a smoother flow of the working fluid in the circuit is obtained.

The setting pump 15 and the metering pump 16 are provided with control racks 38 and 39 respectively, the racks being operable in known manner to vary the timing of plunger-controlled spill ports and thereby to alter the liquid delivery rate independently of the speed of operation of the pumps, or in other words to alter the specific delivery rates of the pumps. In this installation the control rack 39 of the metering pump is preset in position, small adjustments being made by means of a handwheel 40 (Figure 1) which is then locked. The control rack 38 of the setting pump is movable by means of a hand-lever (not shown) which comprises the speed setting control for the installation. The hand-lever is connected to a bell-crank lever 41 through a connecting rod 42.

It will first be assumed that the installation is running normally with the output shaft 12 rotating at the required speed. The metering pump 16 is then removing oil from the operating chamber of the actuator 18 as fast as it is delivered by the setting pump 15 and the quantity of oil within the said operating chamber remains at a fixed value. When the control rack 38 is operated to produce, say, an increase in speed, the delivery rate of the setting pump is increased, thus increasing the quantity of oil in the actuator and causing the scoop control lever 31 to be moved to the right towards the position B. The movement of the lever 31 causes an increase in the speed of the output shaft 12, and thus an increase in the delivery rate of the metering pump 16, until the delivery rate of this pump is equal to the new delivery rate of the setting pump, the quantity of oil in the actuator then becoming stabilised at a new and higher value. The mode of operation of the governor when the speed control is operated to reduce speed will be apparent from the foregoing, being the converse of the sequence described.

If when the installation is in operation the governor is found to "hunt," this may be an indication that the governor is too sensitive in relation to the response of the fluid coupling and the nature of the driven load. Its sensitivity can then be reduced until the hunting stops by adjusting the control rack 39 of the metering pump 16 to reduce the specific delivery rate of the pump and by adjusting the control rack 38 of the setting pump 15 to reduce its specific delivery rate by a corresponding amount.

The design of the working circuit of the coupling 11 is suited to the nature of the drive in which it is used. For example, when the coupling is required to drive a load imposing a substantially constant torque at various speeds (as distinct from a fan or centrifugal pump drive), the impeller may have an open circuit and the runner a full-section continuous core guide ring of larger cross-sectional area than is usual in standard Vulcan turbo-couplings. This promotes steep torque/slip characteristic curves and improves stability of operation. With a small turbo-coupling, e. g. transmitting a few horse power at about 1000 R. P. M., the control fluid pressure in this governor system may be between 15 and 25 lbs. per sq. in. Consequently the governor has a large reserve of power which can be brought into use by using a stiffer biasing spring in the actuator and correspondingly increased control fluid pressures, which renders the governor adaptable for installations of very much higher power.

It will be apparent that in this installation the sensitivity of the governor increases with the speed of the output shaft 12, which is broadly a suitable characteristic to have in relation to the control response of a fluid coupling and by suitable choice of the range of control of the specific delivery rates of the pumps this change in sensitivity can be adjusted to suit the response characteristic and the nature of the drive.

In Figure 5 parts similar to those in Figures 1 to 4 are given the same reference number but with the suffix A if associated with a first one of the two main motors 43, and with the suffix B if associated with the second of these motors. Parts which are common to both motors are given the same reference numeral as in Figures 1 to 4 but with the suffix A.

Each coupling 11 is provided with its own actuator 18 and twin cylinder metering pump 16. The operating chambers of both actuators are supplied with fluid from a single four-cylinder setting pump 15A, the two pairs of adjacent cylinders feeding into outlet ducts 33A and 33B which are connected to the operating chambers of actuators 18A and 18B respectively. The two cylinders of each pair are 180° out of phase with each other and each cylinder of one pair is 90° or 270° out of phase with each cylinder of the other pair. The two pairs of adjacent cylinders of the setting pump constitute two separate pumping units.

The speed of both output shafts 12 can be varied simultaneously by operation of a speed control 44, which is connected to the control rack 38A of the setting pump through a connector 42A and a bell-crank lever 41A. Operation of the speed control causes a simultaneous variation in the delivery rates of the two pairs of cylinders of the setting pump.

The setting of the control bar 39B of the metering pump can be varied by means of a handwheel as in Figure 1. A trimming control 45 is provided for one of the metering pumps, e. g. pump 16A, to enable slight adjustments of the relative speeds of the two output shafts 12 to be made conveniently.

By suitable adjustments of the control bars 39 of the metering pumps the ratio of the speeds of the output shafts can be varied, and by suitable choice of the working ranges of the pumps this relationship can be maintained approximately constant over a range of speeds of the output shafts 12.

It will be apparent that any number, within limits, of metering pumps 16 can be supplied from a single setting pump 15, provided that the latter pump has a sufficient number of cylinders, or preferably pairs of cylinders, the two cylinders of each pair being phased 180° apart. Thus, for example, if it is desired to govern the speeds of four motors relatively to each other, four twin-cylinder metering pumps and a single eight-cylinder setting pump, i. e. comprising four twin-cylinder pumping units, would be required. Instead of a single eight-cylinder setting pump, two four-cylinder pumps coupled together can of course be used.

I claim:

1. A governor comprising a first pump of the positive displacement type, the pump including a plurality of independent pumping units, a single driving member to transmit drive to said pumping units simultaneously, a control member operable to vary the delivery rates of the pumping units simultaneously when the pumping units are constantly driven, and a separate delivery passage for each of said pumping units, a plurality of second pumps of the positive displacement type, equal in number to the plurality of independent pumping units, a control pressure duct connecting each of said delivery ducts to the inlet duct of a different one of said second pumps, and a separate fluid-pressure-responsive actuator, communicating with each of said control pressure ducts.

2. A governor as claimed in claim 1 and including a control member for each of said second pumps operable to vary the delivery rate of such pump when it is constantly driven.

3. A governor as claimed in claim 1 and including a constant speed driving motor coupled to said single driving member and a plurality of further driving members each coupled to transmit drive to one of said second pumps.

4. A speed controlling arrangement comprising a first pump of the positive displacement type provided with first adjustable means for varying the specific delivery rate of said first pump, a second pump of the positive displacement type provided with second adjustable means for varying the specific delivery rate of said second pump, an operating chamber connected between the outlet of said first pump and the inlet of said second pump, a member the speed of which is to be controlled, means for driving said second pump at a speed related to the speed of said member, and means for controlling the speed of said member in accordance with the quantity of fluid in said operating chamber.

5. A speed controlling arrangement according to claim 4, including means for driving said first pump at a substantially constant speed.

6. A speed controlling arrangement according to claim 4, wherein said first pump has plunger-controlled spill ports and said control member comprises a control rack operable to vary the timing of said spill ports.

7. A speed controlling arrangement according to claim 4, wherein said first and second pumps have plunger-controlled spill ports and said first and second adjustable means each include control racks which are operable to vary the timing of said spill ports.

8. A speed controlling arrangement according to claim 4, including a fluid reservoir connected between the outlet of said second pump and the inlet of said first pump, a duct between said operating chamber and said fluid reservoir, and a relief valve in said duct for preventing undue rise of pressure in said operating chamber.

9. A speed controlling arrangement comprising a plurality of independent pumping units of the positive displacement type, common driving means for said pumping units, a plurality of further pumps of the positive displacement type, a plurality of operating chambers connected respectively between the outlets of said pumping units and the inlets of said further pumps, adjustable means for simultaneously varying the specific delivery rates of said pumping units, a plurality of individual means for varying the specific delivery rates of said further pumps, a plurality of members the speeds of which are to be controlled, a plurality of individual means for driving said second pumps at speeds related to the respective speeds of said members, and a plurality of individual means for controlling the speeds of said member in accordance with the quantities of fluid in the respective operating chambers.

10. A speed controlling arrangement according to claim 9, including a fluid reservoir connected between all the outlets of said second pumps and the inlets of said pumping units, a plurality of ducts connected one between each of said operating chambers, and a plurality of relief valves, one in each of said ducts, for preventing undue rise of pressure in said operating chambers.

References Cited in the file of this patent

UNITED STATES PATENTS

| Number | Name | Date |
|---|---|---|
| 1,477,850 | Pool | Dec. 18, 1923 |
| 1,658,307 | Small | Feb. 7, 1928 |
| 1,945,204 | Sim | Jan. 30, 1934 |
| 1,970,380 | Hosel | Aug. 14, 1934 |
| 1,982,711 | Vickers | Dec. 4, 1934 |
| 2,100,997 | Russel | Nov. 30, 1937 |
| 2,218,565 | Vickers | Oct. 22, 1940 |